United States Patent [19]

Sbarro

[11] Patent Number: 5,188,192
[45] Date of Patent: Feb. 23, 1993

[54] MECHANISM FOR VARYING AN INCLINATION ANGLE OF THE STEERING WHEEL RELATIVE OF THE VEHICLE

[75] Inventor: Franco Sbarro, Les Tuileries-de-Grandson, Switzerland

[73] Assignee: SM Sbarro Mottas Engineering S.A., Switzerland

[21] Appl. No.: 582,976

[22] PCT Filed: Jan. 29, 1990

[86] PCT No.: PCT/CH90/00018

§ 371 Date: Sep. 28, 1990

§ 102(e) Date: Sep. 28, 1990

[87] PCT Pub. No.: WO90/08687

PCT Pub. Date: Aug. 9, 1990

[30] Foreign Application Priority Data

Jan. 30, 1989 [FR] France ............................ 89 01323

[51] Int. Cl.⁵ .............................................. B62K 21/00
[52] U.S. Cl. ................................ 180/219; 180/24.05; 180/221; 180/222; 280/277; 280/279
[58] Field of Search ............ 180/219, 221, 222, 24.05, 180/20; 280/276, 277, 279, 280

[56] References Cited

U.S. PATENT DOCUMENTS

| | | |
|---|---|---|
| 436,844 | 9/1890 | Thorp . |
| 3,329,444 | 7/1967 | Lidov . |
| 3,884,317 | 5/1975 | Kinzel . |
| 4,045,096 | 8/1977 | Lidov . |
| 4,265,329 | 5/1981 | de Cortanze ............ 180/219 |
| 4,526,249 | 7/1985 | Parker . |
| 4,712,638 | 12/1987 | Kawaguchi et al. . |
| 4,723,621 | 2/1988 | Kawano et al. . |
| 4,726,603 | 2/1988 | Sugiyama et al. . |
| 4,813,511 | 3/1989 | Yamaguchi et al. . |
| 4,836,577 | 6/1989 | Abe et al. . |
| 4,917,209 | 4/1990 | Horiike et al. ............ 180/219 |
| 5,014,807 | 5/1991 | Horiike et al. ............ 180/219 |
| 5,014,808 | 5/1991 | Savard et al. ............ 180/219 |

FOREIGN PATENT DOCUMENTS

| | | |
|---|---|---|
| 321803 | 6/1989 | European Pat. Off. . |
| 3629881 | 3/0987 | Fed. Rep. of Germany . |
| 890247 | 2/1944 | France . |
| 2533523 | 3/1984 | France . |
| 2608974 | 7/1988 | France . |
| 141383 | 5/1990 | Japan . |
| 2199794 | 7/1988 | United Kingdom . |
| 88/05743 | 8/1988 | World Int. Prop. O. . |
| 90/00477 | 1/1990 | World Int. Prop. O. . |

Primary Examiner—Mitchell J. Hill
Attorney, Agent, or Firm—Davis, Bujold & Streck

[57] ABSTRACT

The steering wheel of the vehicle is comprised of an annular roller bearing (22) having an interior annular element (23) which is integral with, for example, an interior element (26) of a second roller bearing (24) and an exterior annular element (21) of the annular roller bearing (22) supports a rim (19) and a tire (20). An exterior element (25) of the second roller bearing (24) is mounted via a pivot (40) supported by an articulated arm (17). The inclination of the second roller bearing and, consequently a caster angle of the steering wheel, is variable by way of a double-acting hydraulic actuator (42) which is supplied with hydraulic fluid by a hydraulic pump (46) driven by a motor (47) and controlled by an electronic circuit (48) coupled to a gear selector mechanism of the vehicle.

8 Claims, 2 Drawing Sheets

MECHANISM FOR VARYING AN INCLINATION ANGLE OF THE STEERING WHEEL RELATIVE OF THE VEHICLE

The present invention concerns a motorized or tractor drawn vehicle designed for travel on a particular surface, said vehicle comprising at least two wheels, at least one of which is a steering wheel, each wheel comprising a central portion connected to the base structure of the vehicle and a peripheral portion concentric to the said central portion and disposed to turn about the central portion, said central portion and said peripheral portion being interconnected by means of at least one ring shaped bearing, said first bearing comprising at least one interior annular element integral with the said central portion of the wheel and at least one peripheral annular portion concentric to the said interior annular portion and integral with the said peripheral portion, said latter portion having a contact means appropriate to the nature of the surface with which the vehicle will be in contact, and the said central portion of the wheel being connected to the base structure of the vehicle at at least one connection point which is off-center on the wheel, wherein the said steering wheel is connected to the base structure of the vehicle by at least one second bearing disposed in a plane perpendicular to the plane of the said first bearing and comprising one of the interior or exterior elements integral with the said interior annular element of the said first bearing and with the other exterior or interior element integral with the base structure of the vehicle.

BACKGROUND OF THE INVENTION

With motorcycles, particularly high performance motorcycles for racing, the proper regulation of inclination of the steering axis of the steering axis affords the driver a fundamental advantage. At high speed and along a straight line significant rearward inclination considerably increases vehicle stability and allows the driver to safely increase speed to the maximum. Conversely, the greater the angle, the harder the handlebar is to turn. Thus, it is obvious that on slopes with frequent sharp curves or on mountain roads, inclination should be minimal to eliminate wasting driver time on turns or forcing the driver to exert too great an effort to guide the vehicle. An ideal solution would be to achieve a vehicle wherein inclination could be regulated on course, that is, increased for travel in straight lines and reduced for curves.

This is the aim which the present invention proposes to achieve.

SUMMARY OF THE INVENTION

According to the invention, the vehicle defined herein is characterized in that the said second bearing is pivotably mounted on the base structure of the vehicle, which comprises means to cause this bearing to pivot and thereby modify the inclination of the steering wheel (caster angle of the steering wheel).

According to a particularly advantageous embodiment, one of the elements of the second bearing is mounted, at one end, on at least one arm of the base structure of the vehicle by means of a pivoting device and at the other end, is connected to a hydraulic piston integral with said structure, and the other element is integral with the interior annular element of the first bearing.

Preferably, the hydraulic piston is a two-way piston and is supplied with hydraulic fluid by a pump. Said pump may be controlled by an independent manual control means.

Preferably, the pump is controlled by a mechanical device connected to the gearshift, said device being disposed to increase inclination of the steering wheel in successive stages, said increase corresponding to the order of shifting to higher gears, and to reduce inclination in successive stages, said reduction corresponding to the order of shifting to lower gears.

The pump is advantageously connected to an electrical motor and said electrical motor is associated with an electrical supply circuit designed to supply the motor during predetermined time intervals, with each shift of gears.

The said electrical supply circuit is preferably disposed to cause the hydraulic pump to function in a first direction, transmitting hydraulic fluid to the piston so that the angle of the second bearing increases with each shift to higher gear, and to cause the hydraulic pump to function in a second direction transmitting hydraulic fluid to the piston so that the angle of the second bearing decreases with each shift to lower gear.

Because of the present invention, inclination may be increased or decreased at will during travel or on course, which is an extremely important advantage for the driver, since the vehicle is always operating under optimal safety conditions without any restraints whatsoever being imposed upon the driver.

BRIEF DESCRIPTION OF THE DRAWINGS

The present invention will be better understood with reference to the description of one exemplary embodiment and to the attached drawing, wherein.

DESCRIPTION OF THE PREFERRED EMBODIMENTS

Figure 1:
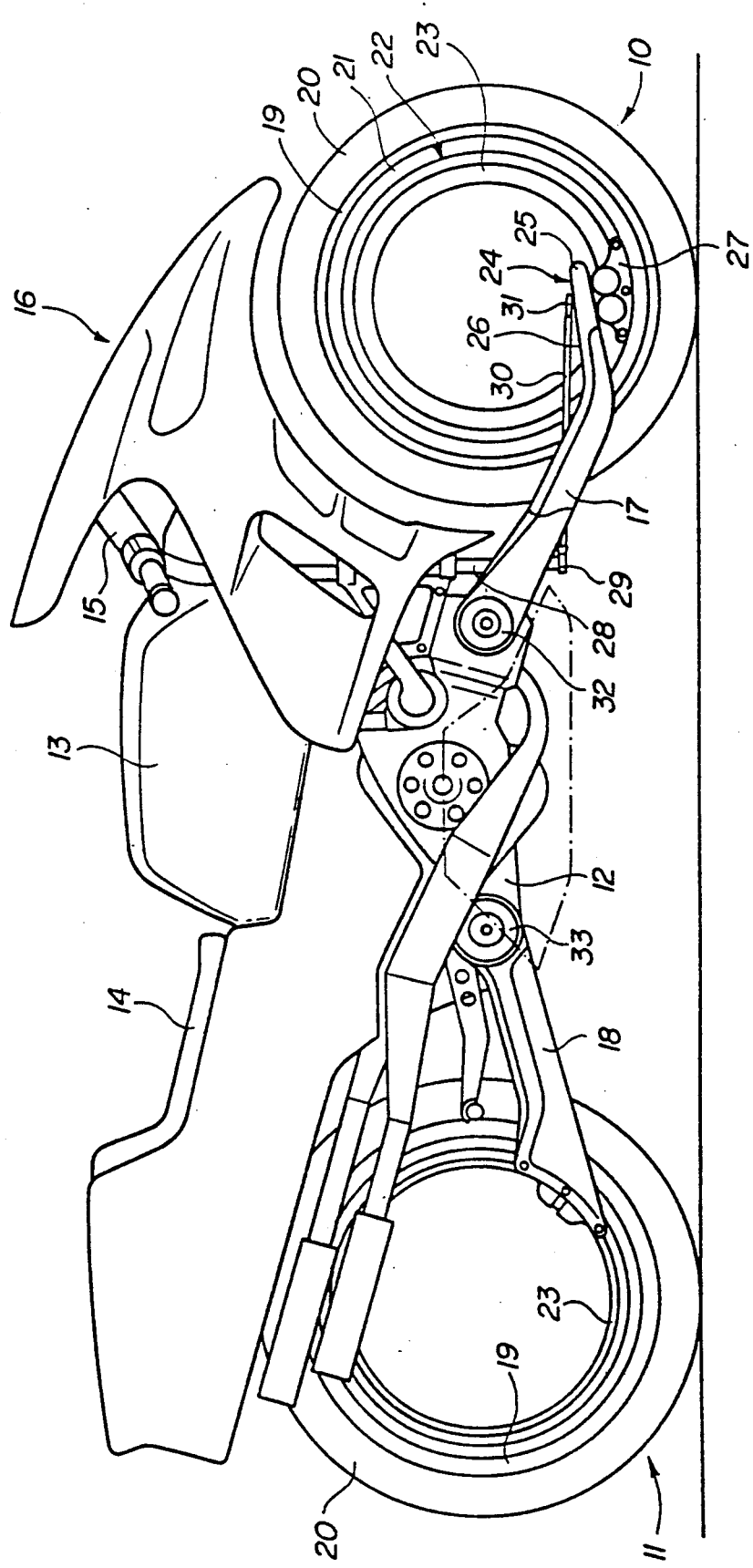
FIG. 1 is a schematic view of a two wheeled vehicle according to the invention.

The motorcycle shown in FIG. 1 comprises in known manner a steering front wheel 10, a rear wheel 11 being driven by a motor 12, a gas tank 13 and a seat 14, these various elements being covered by a wind foil 16. The front wheel is attached to the motor by means of at least one arm 17 which may also be a fork shaped element. The rear wheel 11 is preferably held by only one arm 18 which may also be replaced by a forked element. Each wheel has a rim 19 on which there is mounted a tire 20 and the rim 19 and the tire 20 comprise a peripheral portion of the wheel. Rim 19 is attached to an exterior annular element 21 of a large diameter ball bearing (a first ring shaped bearing) 22. Arms 17 and 18 are respectively attached to an interior annular element 23 (inner portion) of bearings 22 corresponding to front and rear wheels 10 and 11, respectively.

At its anterior extremity arm 17 supports a second bearing 24 which bears axial and radial forces exterior annular element (exterior elements) 25 of which is rigidly attached to said extremity of arm 17, or held by the two branches of the fork if arm 17 is replaced by a fork, and interior annular element 26 of said second bearing 24 is rigidly attached to interior annular (interior elements) element 23 of first bearing 22, which is also the median plane of the wheel. Its axis 36 is the pivoting axis of the steering wheel 10 and passes through the theoretical center point O of the wheel in the position shown in FIG. 2. The axis 36 is slightly inclined rearwards in the plane of the wheel and forms a caster angle C with a radial line 37 (generally vertical) defined by the center point O and the contact point P between the wheel and the road surface 38. The caster angle C is equal to the longitudinal inclination of the second bearing 24 with respect to the road surface.

Note that handlebar 15 is connected to interior annular element 25 of second bearing 24 by means of a rod consisting of a generally vertical shaft 28, articulated at its extremity 29 to a generally horizontal shaft 30 which is connected to said annular element 25 by means of a ball joint 31.

In this embodiment, the two arms 17 and 18 are directly articulated at 32 and 33, respectively, to the engine block itself or to a support for said block. Suspension may be achieved according to various known principles, notably by means of a carbon fiber spring and conventional shock absorbers attached to arms 17 and 18.

Because of this construction, and especially because of the unique concept of the wheels, conventional heavy, cumbersome hubs are virtually non-existent and all forces are transmitted directly to the wheels at points located as close as possible to the area of contact between the tires and the road surface.

Figure 2:
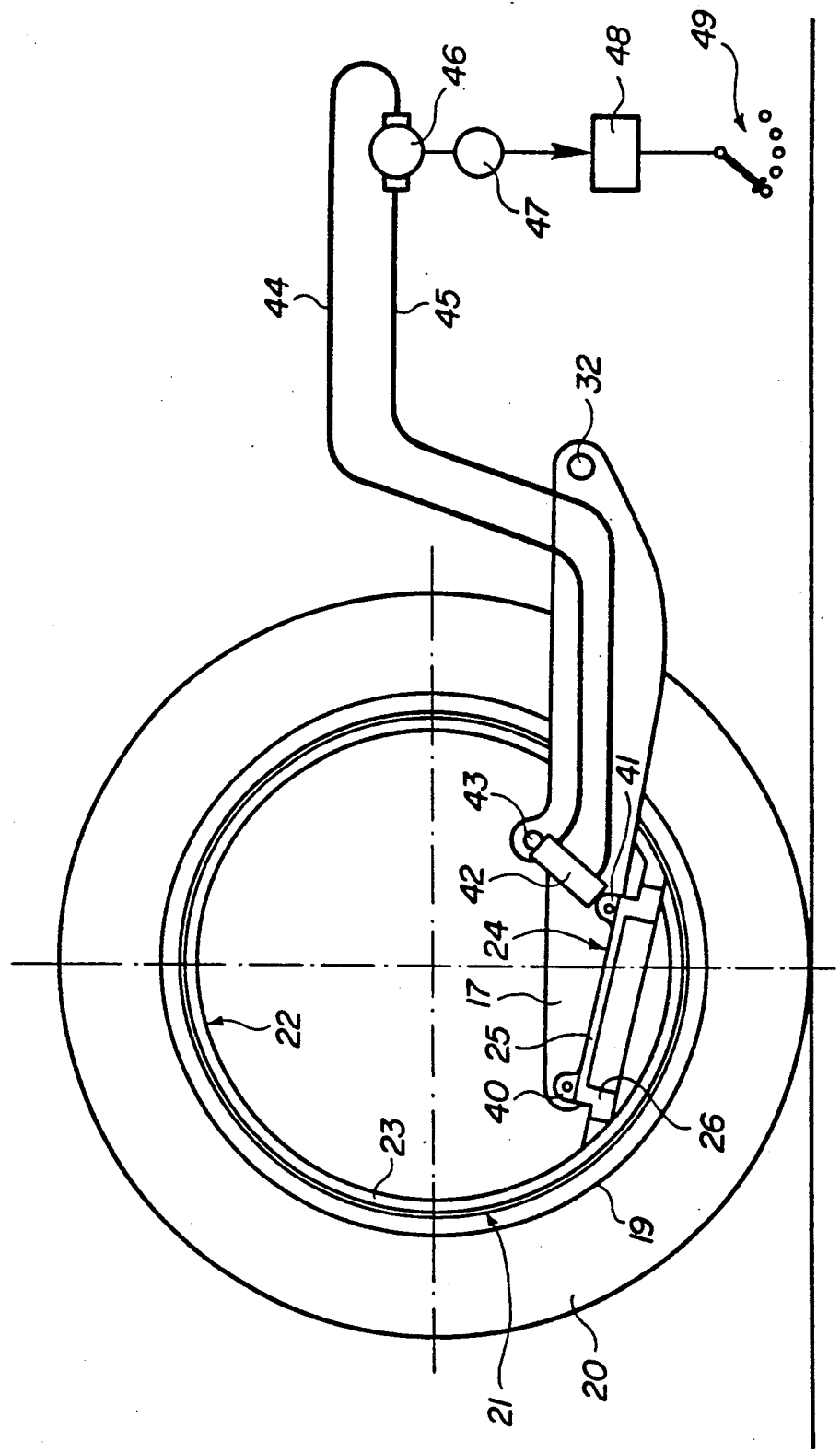
FIG. 2 is a schematic view of the steering wheel of said vehicle provided with a device for controlling its variable inclination.

FIG. 2 is a schematic drawing in which arm 17 comprises a pivoting axis 40 on which a first end portion of the exterior element 25 of second bearing 24 is mounted. Interior element 26 of second bearing 24, in the example shown, is made integral with interior annular element 23 of bearing 22, while exterior annular element 21 supports rim 19 and tire 20. It should be noted, however, that the roles of the two elements, interior element 26 and exterior element 25 of second bearing 24, respectively, may be reversed. Exterior element 25 of second bearing 24 is then connected (actuator at point 41 to the movable shaft of hydraulic piston), adjacent a remote second end portion thereof, 42 mounted at 43 on said arm 17. Piston 42 is a two-way hydraulic piston which is fed by a hydraulic pump 46 through two conduits, 44 and 45, respectively. Said hydraulic pump is driven by an electric motor 47 which is connected to an electrical supply source 48 associated with a selector 49. Electrical circuit 48 is designed to regulate electric motor 47 during predetermined time intervals, each time the driver changes gears. Selector 49 is mechanically connected to the gearshift 50 in such a way that with each shift to higher gear, electric motor 47 causes pump 46 to rotate in a direction causing the shaft of hydraulic piston 42 to be pushed out of the body of the piston and engenders an increase in the angle of second bearing 24, that is, of the inclination of the drive wheel (the caster angle of the steering wheel 10) as well and, in such a way that shifting to lower gear causes the pump to rotate in the other direction so that the shaft of piston 42 returns inside the body of the piston, reducing the angle of second bearing 24 and consequently the inclination of the drive wheel caster angle of the steering wheel 10.

In conclusion, it is evident that each gear position corresponds to a predetermined angle of the caster angle of steering wheel 10 the two wheeled vehicle, which is truly a revolution in the domain of the concept and use of such vehicles.

The present invention is not limited to the forms of embodiments described, but may undergo various modifications and changes obvious to one skilled in the art.

d

I claim:

1. A vehicle for traveling on a desired road surface, said vehicle having a base structure and comprising at least two wheels with at least one of said at least two wheels being a steering wheel, each of said at least two wheels comprising an inner portion connected to said base structure and a peripheral portion concentric with and rotating about said inner portion, each said peripheral portion supporting means for engaging the road surface upon which the vehicle will travel, said inner portion and said peripheral portion of each wheel being interconnected with one another by a first ring shaped bearing comprising an interior annular element forming said inner portion, and an exterior annular element concentric with said interior annular element and connected with said peripheral portion, and said interior annular element of each of said at least two wheels being connected to said base structure of the vehicle at at least one connection point which is off-center of the wheel;

wherein a second bearing connects said steering wheel to said base structure at the off-center connection point, said second bearing is disposed in a plane substantially perpendicular to a plane defined by said first bearing and comprises an interior element and an exterior element, one of said interior and said exterior elements of said second bearing is connected to said interior annular element of said first bearing and the other of said interior and said exterior elements of said second bearing is ad connected to said base structure of the vehicle via a pivot axis which is the substantially horizontal and transverse of said base structure, and means for causing said second bearing to pivot about said pivot axis so as to vary inclination of said second bearing, during vehicle use, relative to the road surfaces.

2. A vehicle according to claim 1, wherein a first end portion of one of said interior and exterior elements of said second bearing is ad mounted to said base structure and a second remote end portion of that element is connected to a hydraulic actuator which is connected to said base structure, and the other of said interior and exterior elements of said second bearing is integral with said interior annular element of said first bearing.

3. A vehicle according to claim 2, wherein said hydraulic actuator is a two-way type actuator and a hydraulic pump supplies hydraulic fluid to said hydraulic actuator.

4. A vehicle according to claim 3, wherein said means for causing said second bearing to pivot about said pivot axis includes manual selector means for selectively controlling operation of said hydraulic pump.

5. A vehicle according to claim 3, wherein the vehicle has a gearshift and said hydraulic pump is controlled by a mechanical device communicating with said gearshift, said mechanical device causes successive incremental increases in the inclination of said second bearing relative to the road surface for each shift of said gearshift to a higher gear and causes successive incremental decreases in the inclination of said second bearing relative to the road surface for each shift of said gearshift to a lower gear.

6. A vehicle according to claim 5, wherein said hydraulic pump is connected to an electric motor and said electric motor is connected to an electrical circuit which actuates said electric motor for predetermined time intervals with each gear shift.

7. A vehicle according to claim 6, wherein said electrical circuit causes said hydraulic pump to operate in a first direction transmitting hydraulic fluid to said hydraulic actuator so as to increase the inclination of said second bearing relative to the road surface with each gear shift to a higher gear, and said electronic circuit causes said hydraulic pump to operate in a second opposite direction transmitting hydraulic fluid to said hydraulic actuator so as to decrease the inclination of said second bearing relative to the road surface with each gear shift to a lower gear.

8. A motorized vehicle for traveling on a desired road surface, said vehicle having a base structure and comprising at least two wheels with at least one of said at least two wheels being a steering wheel, said steering wheel comprising an inner portion connected to said base structure and a peripheral portion concentric with and rotating about said inner portion, said peripheral portion supporting means for engaging the road surface upon which the vehicle will travel, said inner portion and said peripheral portion being comprising an interior annular element forming said inner portion, and an exterior annular element concentric with said interior annular element and connected with said peripheral portion, and said interior annular element being connected to said base structure of the vehicle at at least one connection point which is off-center of said steering wheel;

wherein a second bearing connects said steering wheel to said base strucfure, said second bearing is disposed in a plane substantially perpendicular to a plane defined by said first bearing and comprises an interior element and an exterior elements, one of said interior and said exterior elements of said second bearing is connected to said interior annular element of said first bearing and the other of said interior and said exterior elements of said second bearing is ad connected to said base structure of the vehicle via a pivot axis which is substantially horizontal and transverse of said base structure, and means for causing said second bearing to pivot about said pivot axis so as to vary inclination of said second bearing relative to the road surfaces.

* * * * *

UNITED STATES PATENT AND TRADEMARK OFFICE
CERTIFICATE OF CORRECTION

PATENT NO. : 5,188,192
DATED : February 23, 1993
INVENTOR(S) : Franco SBARRO

It is certified that error appears in the above-identified patent and that said Letters Patent is hereby corrected as shown below:

Column 4, line 32 replace "ad" with --pivotably--;
         line 42 replace "ad" with --pivotably--.

Column 5, line 23 after "being" insert --interconnected with one another by a first ring shaped bearing--.

Column 6, line 12 replace "elements" with --element--;
         line 17 replace "ad" with --pivotably--.

Signed and Sealed this

Twenty-third Day of November, 1993

Attest:

BRUCE LEHMAN

Attesting Officer

Commissioner of Patents and Trademarks